United States Patent
Batta

(10) Patent No.: US 8,121,102 B2
(45) Date of Patent: Feb. 21, 2012

(54) METHODS AND APPARATUS FOR RECOVERING FROM MISCONFIGURATION IN A WLAN

(75) Inventor: Puneet Batta, Sunnyvale, CA (US)

(73) Assignee: Symbol Technologies, Inc., Holtsville, NY (US)

(*) Notice: Subject to any disclaimer, the term of this patent is extended or adjusted under 35 U.S.C. 154(b) by 557 days.

(21) Appl. No.: 12/362,647

(22) Filed: Jan. 30, 2009

(65) Prior Publication Data
US 2010/0195631 A1  Aug. 5, 2010

(51) Int. Cl.
*H04W 4/00* (2009.01)
(52) U.S. Cl. .............. 370/338; 370/457; 455/422.1
(58) Field of Classification Search .......... 370/335–338, 370/342–345, 453, 457; 455/423–425, 435.1–435.3, 455/68–70
See application file for complete search history.

(56) References Cited

U.S. PATENT DOCUMENTS

| | | | | |
|---|---|---|---|---|
| 7,283,505 | B1* | 10/2007 | Meenan et al. | 370/338 |
| 7,990,915 | B2* | 8/2011 | Wang et al. | 370/328 |
| 2002/0083316 | A1* | 6/2002 | Platenberg et al. | 713/2 |
| 2007/0268515 | A1* | 11/2007 | Freund et al. | 358/1.15 |
| 2007/0268516 | A1* | 11/2007 | Bugwadia et al. | 358/1.15 |

* cited by examiner

*Primary Examiner* — Thai Hoang

(57) ABSTRACT

A method of recovering from misconfiguration of APs and other networked components includes storing a "safe" configuration, implementing a configuration request received from a network operations center (NOC), then reverting to the stored configuration in the event that connectivity is not restored with the NOC within a predetermined time period. The NOC is configured to transmit one or more handshake messages to the AP after sending the configuration request.

15 Claims, 2 Drawing Sheets

METHODS AND APPARATUS FOR RECOVERING FROM MISCONFIGURATION IN A WLAN

TECHNICAL FIELD

The present invention relates generally to wireless local area networks (WLANs) and, more particularly, to management of access points and other components within a WLAN.

BACKGROUND

In recent years, there has been a dramatic increase in demand for mobile connectivity solutions utilizing various wireless components and wireless local area networks (WLANs). This generally involves the use of wireless access points (APs) that communicate with mobile devices using one or more RF channels.

In one class of wireless networking systems, relatively unintelligent access ports act as RF conduits for information that is passed to the network through a centralized intelligent switch, or "wireless switch," that controls wireless network functions. In a typical WLAN setting, one or more wireless switches communicate via conventional networks with multiple access points that provide wireless links to mobile units operated by end users.

The wireless switch, then, typically acts as a logical "central point" for most wireless functionality. Consolidation of WLAN intelligence and functionality within a wireless switch provides many benefits, including centralized administration and simplified configuration of switches and access points.

A WLAN in a particular enterprise may include hundreds of APs and switches spread out geographically among a large number of sites, and it is often desirable to manage those APs centrally, through a network operations center (NOC). In this way, APs and other components may be reconfigured, upgraded, and otherwise modified remotely.

It is not unusual, however, for an AP or other device to be inadvertently misconfigured—e.g., due to the wrong software version, etc. Accordingly, an AP may receive a configuration request from the NOC, enact the configuration change, and then lose connectivity with the NOC (and/or with the network in general) because of misconfiguration. Since the misconfigured AP can no longer communicate with the NOC, the misconfiguration cannot be remedied remotely, and instead requires that local site personnel address the issue, which can be time consuming and costly.

Accordingly, it is desirable to provide improved methods and systems for recovering from misconfiguration of APs and other networked components. Other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The present invention relates to a method of recovering from misconfiguration of APs and other networked components whereby the component stores the previous "safe" configuration, enacts a reconfiguration change received from a NOC, then reverts to the stored configuration in the event that connectivity is not restored with the NOC within a predetermined time period. In this regard, the following detailed description is merely illustrative in nature and is not intended to limit the invention or the application and uses of the invention. Furthermore, there is no intention to be bound by any express or implied theory presented in the preceding technical field, background, brief summary or the following detailed description.

Various aspects of the exemplary embodiments may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., radio-frequency (RF) devices, memory elements, digital signal processing elements, logic elements and/or the like, which may carry out a variety of functions under the control of one or more microprocessors or other control devices. In addition, the present invention may be practiced in conjunction with any number of data transmission protocols and that the system described herein is merely one exemplary application for the invention.

For the sake of brevity, conventional techniques related to signal processing, data transmission, signaling, network control, the IEEE 802.11 family of specifications, and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Without loss of generality, in the illustrated embodiment, many of the functions usually provided by a traditional wireless access point (e.g., network management, wireless configuration, and the like) can be concentrated in a corresponding wireless switch. It will be appreciated that the present invention is not so limited, and that the methods and systems described herein may be used in the context of other network environments, including any architecture that makes use of client-server principles or structures.

Figure 1:
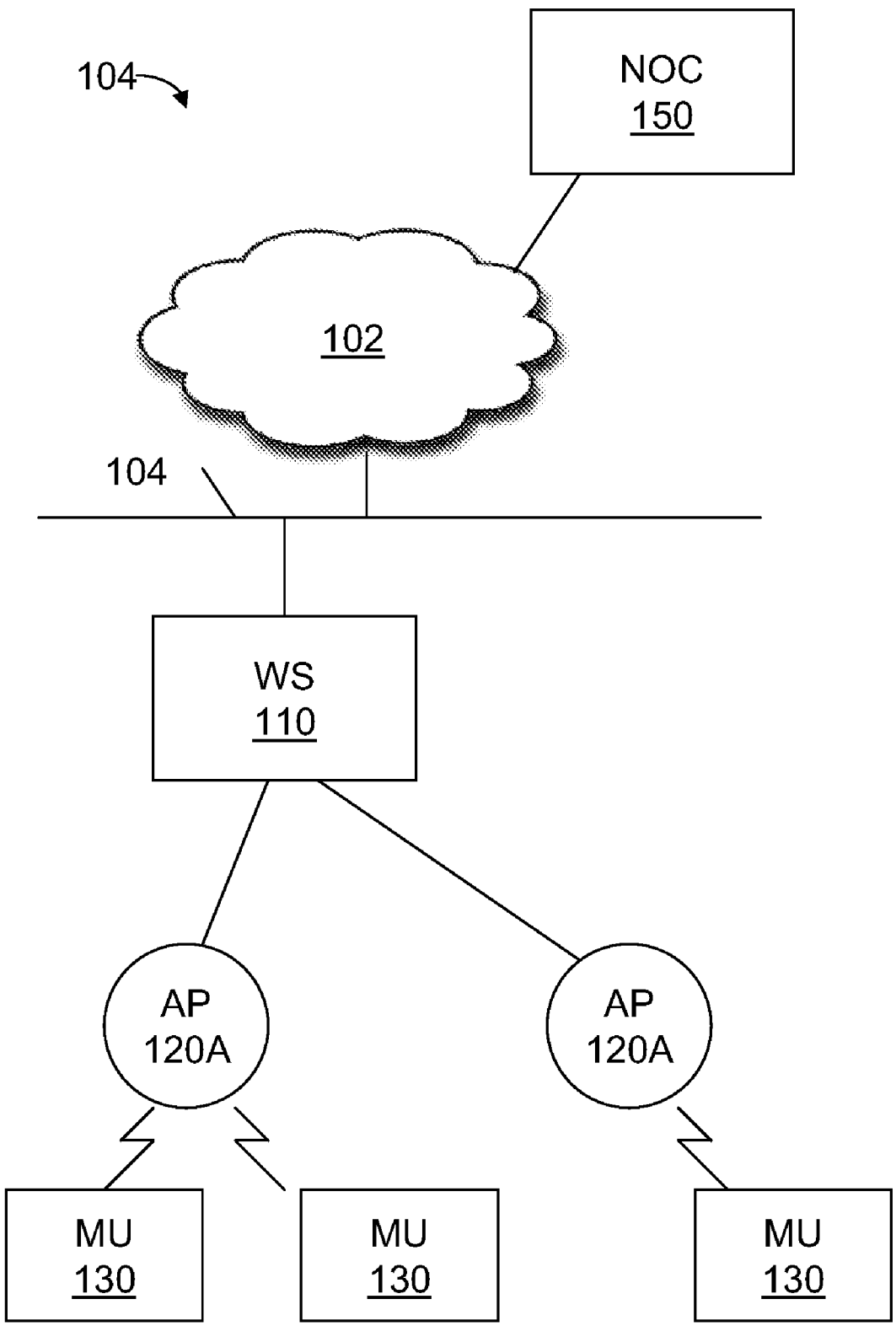
FIG. 1 is a conceptual overview of an exemplary wireless network according to one embodiment.

Referring now to the exemplary, simplified WLAN architecture 100 shown in FIG. 1, one or more switching devices 110 (alternatively referred to as "wireless switches," "WS," or simply "switches") are coupled via one or more networks 104 (e.g., an Ethernet or other local area network coupled to one or more other networks or devices, indicated by network cloud 102). One or more wireless access ports 120 (alternatively referred to as "access ports" or "APs") are configured to wirelessly connect switches 110 to one or more mobile units 130 (or "MUs") after a suitable AP adoption process. APs 120 are suitably connected to corresponding switches 110 via communication lines 106 (e.g., conventional Ethernet lines). A network operations center (NOC) 150 is coupled to network 102 and is configured to communicate with APs 120, as described in further detail below.

Any number of additional and/or intervening switches, routers, servers and other networks or components may also be present in the system. Similarly, APs 120 may have a single or multiple built-in radio components. Various wireless switches and access ports are available from SYMBOL TECHNOLOGIES of San Jose, Calif., although the concepts described herein may be implemented with products and services provided by any other supplier.

A particular AP 120 may have a number of associated MUs 130. For example, in the illustrated topology, two MUs 130 are logically associated with AP 120A, while one MU 130 is associated with AP 120B. Again, the logical connections shown in the figures are merely exemplary, and other embodiments may include widely varying components arranged in any topology.

Following an adoption process, each WS 110 determines the destination of packets it receives over network 104 and routes that packet to the appropriate AP 120 if the destination is an MU 130 with which the AP is associated. Each WS 110 therefore maintains a routing list of MUs 130 and their associated APs 130. These lists are generated using a suitable packet handling process as is known in the art. Thus, each AP 120 acts primarily as a conduit, sending/receiving RF transmissions via MUs 130, and sending/receiving packets via a network protocol with WS 110. Equivalent embodiments may provide additional or different functions as appropriate.

The present invention relates to a method of recovering from misconfiguration of APs and other networked components whereby the component stores the previous "safe" configuration, enacts a reconfiguration change received from a NOC, then reverts to the stored configuration in the event that connectivity is not restored with the NOC within a predetermined time period.

Figure 2:
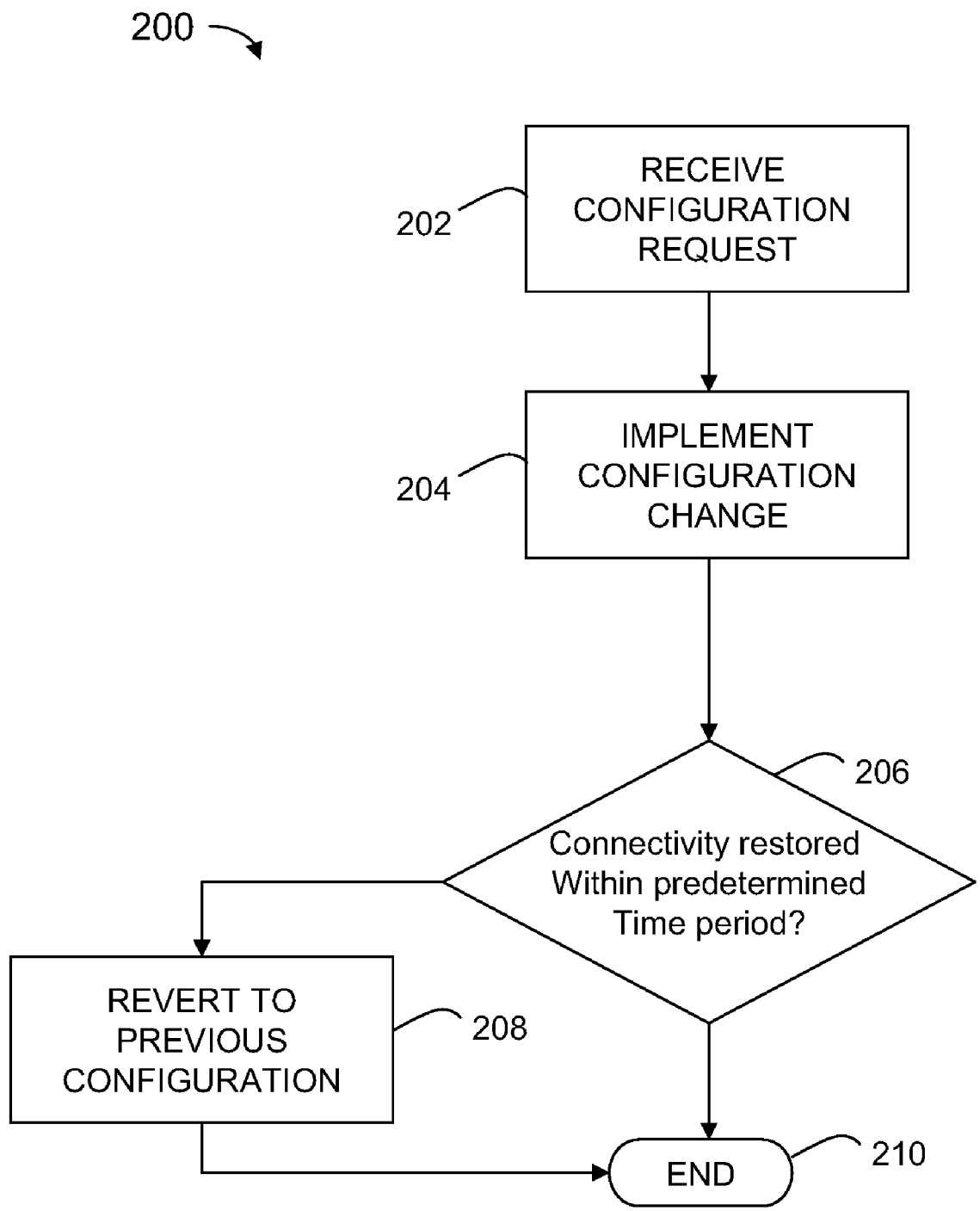
FIG. 2 is a flowchart depicting a method in accordance with one embodiment of the present invention.

FIG. 2 is a flowchart illustrating an exemplary method 200 in accordance with one embodiment of the present invention, and will be described in conjunction with the simplified network shown in FIG. 1.

Initially, a configuration request is received (step 202). That is, NOC 150 transmits a suitably formatted configuration request to, for example, AP 120A, and AP 120A then receives and interprets that request. The configuration request may include, for example, a desired change to the software and/or firmware running within AP 120A. The configuration request may be transmitted automatically, or manually by an administrator.

The nature of such configuration requests are known in the art, and need not be described in detail herein.

Next, in step 204, enacts (implements) the configuration request, only after storing the current or previous configuration, e.g., within a memory housed within AP 120A. If, for example, the configuration request consists of a request to install a new version of firmware, AP 120A runs the appropriate installation procedure to conform to the request.

Subsequently, in step 206, AP 120A determines whether connectivity to NOC 150 has been restored (e.g., after the configuration change is implemented) within a predetermined time period. This connectivity test may take a variety of forms. In one embodiment, for example, NOC 150 sends one or more ping, handshake, or other type messages (generally referred to herein as a "handshake message") to AP 120A after sending the configuration request. AP 120A then attempts to achieve connectivity and waits for receipt of the handshake message. The predetermined time may be any suitable time frame, from less than a second to a few seconds, depending upon the nature of the configuration change and other factors.

If connectivity is restored within the predetermined time period, the configuration request has been successfully implemented, and the method terminates (step 210). If, however, connectivity was not restored within the predetermined time period, AP 120A reverts to the previous, stored configuration (step 208). That is, for example, in the event that a new firmware version configuration change resulted in a loss of connectivity, AP 120A then reinstalls the previous configuration. Stated another way, the configuration change is not permanent until AP 120A receives the required handshake message.

In this way, misconfiguration of APs is effectively self-healing, and does not require local network personnel to address unintended loss of connectivity to NOC 150 or other network components.

In accordance with another embodiment, recovering from a misconfiguration is accomplished by allowing the AP to communicate through another AP to send information to the NOC. Thus, before applying the configuration to a first AP (AP1), the NOC informs AP1 regarding one or more parameters of AP2 (e.g., its IP address for wire-side communication, its SSID for wireless communication) and instructs AP1 to use that AP as a backup in case it does not hear the configuration confirmation. A wireless communication with AP2 is possible based on just the SSID alone. This kind of recovery is useful if the AP1 is not able to keep a backup copy of its configuration (because of less resources on the AP, or just architectural limitations). Instead of keeping a copy of the older configuration, the NOC simply provides an alternate means through which that AP can reach the NOC and receive correct configuration information if there is a problem the first time.

The particular aspects and features described herein may be implemented in any manner. In various embodiments, the processes described above are implemented in software that executes within one or more NOCs 150 and one or more APs 120. This software may be in source or object code form, and may reside in any medium or media, including random access, read only, flash or other memory, as well as any magnetic, optical or other storage media. In other embodiments, the features described herein may be implemented in hardware, firmware and/or any other suitable logic.

It should be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for managing a wireless access point within a wireless local area network system including a plurality of access points coupled to the network and a plurality of mobile units, each associated with one of the access points, the method comprising:
  storing, within the wireless access point, a correct configuration associated with the operational state of the wireless access point;
  sending to the wireless access point, over the network, a configuration request from a network operations center;

implementing the configuration request such that a second configuration is associated with the operational state of the wireless access point;

determining whether, within a predetermined time period, connectivity exists between the wireless access point to the network operations center; and reverting to the correct configuration if connectivity does not exist between the wireless access point and the network operations center within the predetermined time period.

2. The method of claim 1, wherein the wireless access point operates in accordance with an IEEE 802.11 standard.

3. The method of claim 2, further including waiting for the handshake message to be received at the wireless access point within the predetermined time period.

4. The method of claim 1, wherein the determining step includes sending a handshake message from the network operations center to the wireless access point after sending the configuration request.

5. A wireless access point among a plurality of access points coupled within a wireless local area network that includes a plurality of mobile units, each associated with one of the access points, the wireless access point comprising:

a memory configured to store a correct configuration associated with the operational state of the wireless access point, and a microprocessor coupled to the memory, wherein the memory includes machine-readable instructions configured to be executed by the microprocessor in order to receive a configuration request from a network operations center over the network, implement the configuration request such that the access point is characterized by a second configuration associated with the operational state of the wireless access point, and revert to the correct configuration if connectivity to the network operations center does not exist within a predetermined amount of time.

6. The access point of claim 5, wherein the determining step includes sending a handshake message from the network operations center to the wireless access point after sending the configuration request.

7. The access point of claim 6, further including waiting for the handshake message to be received at the wireless access point within the predetermined time period.

8. A wireless local area network system comprising:

a plurality of access points coupled to the network;

a plurality of mobile units, each associated with one of the access points;

a network operation center coupled to the network;

wherein the network operation center is configured to send, over the network, a configuration request to the first access point; and wherein the first access point is configured to implement the configuration request then implement a corrected configuration in the event that connectivity to the network operation center is not established within a predetermined time period.

9. The system of claim 8, wherein network operations center is configured to send a handshake message to the first access point after sending the configuration request.

10. The system of claim 9, wherein the first access point is configured to wait for the handshake message to be received within the predetermined time period.

11. The system of claim 8, wherein the wireless local area network is an IEEE 802.11 network.

12. The system of claim 8, wherein the first access point is configured to implement the corrected configuration by receiving configuration information via a second access point coupled to the network.

13. The system of claim 12, wherein the first access point is configured to receive, from the network operation center, information regarding the identity of the second access point.

14. The system of claim 13, wherein the identity of the second access point is an IP address.

15. The system of claim 13, wherein the identity of the second access point is an SSID.

* * * * *

UNITED STATES PATENT AND TRADEMARK OFFICE
CERTIFICATE OF CORRECTION

PATENT NO.       : 8,121,102 B2
APPLICATION NO.  : 12/362647
DATED            : February 21, 2012
INVENTOR(S)      : Batta Page 1 of 1

It is certified that error appears in the above-identified patent and that said Letters Patent is hereby corrected as shown below:

On the Face Page, in the Figure, delete " 104 " and insert -- 100 --, therefor.

On the Face Page, in the Figure, delete " 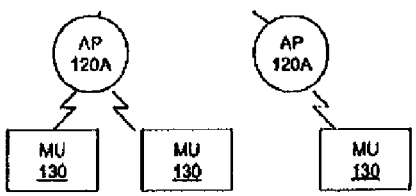 " and insert -- 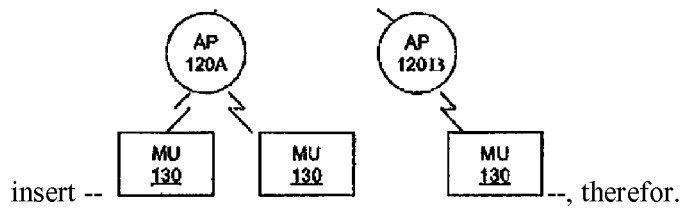 --, therefor.

In Fig. 1, Sheet 1 of 2, delete " 104 " and insert -- 100 --, therefor.

In Fig. 1, Sheet 1 of 2, delete " 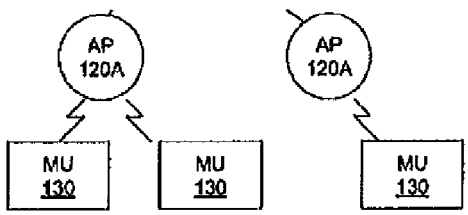 " and insert -- 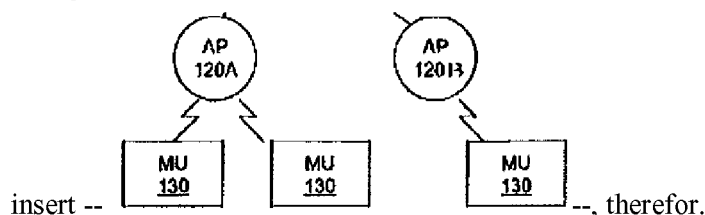 --, therefor.

Signed and Sealed this
First Day of January, 2013

David J. Kappos
*Director of the United States Patent and Trademark Office*